United States Patent (12)
Yasui et al.

(10) Patent No.: US 9,286,531 B2
(45) Date of Patent: Mar. 15, 2016

(54) LOG-IMAGE EXTRACTING APPARATUS FOR HIGH SECURITY

(71) Applicant: Kyocera Document Solutions Inc., Osaka (JP)

(72) Inventors: Toru Yasui, Osaka (JP); Jumpei Takagi, Osaka (JP); Keiji Okamura, Osaka (JP); Ryota Arinobu, Osaka (JP); Masaki Kikuchi, Osaka (JP); Rie Matsumoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/283,408

(22) Filed: May 21, 2014

(65) Prior Publication Data

US 2014/0348430 A1    Nov. 27, 2014

(30) Foreign Application Priority Data

May 21, 2013    (JP) ................................ 2013-107524

(51) Int. Cl.
*G06K 9/00*    (2006.01)
*G06K 9/20*    (2006.01)

(52) U.S. Cl.
CPC .......... *G06K 9/2063* (2013.01); *G06K 9/00449* (2013.01)

(58) Field of Classification Search
None
See application file for complete search history.

(56) References Cited

U.S. PATENT DOCUMENTS

| 8,639,036 B1* | 1/2014 | Singer et al. ................... 382/200 |
| 8,782,516 B1* | 7/2014 | Dozier ................... G06F 17/218 715/236 |
| 2004/0109181 A1* | 6/2004 | Suzuki ........................... 358/1.9 |
| 2007/0115495 A1* | 5/2007 | Ebitani ......................... 358/1.14 |
| 2008/0170786 A1* | 7/2008 | Tomizawa et al. ............. 382/176 |
| 2008/0199082 A1* | 8/2008 | Tanaka ............... G06K 9/00449 382/199 |
| 2009/0080783 A1* | 3/2009 | Hirohata ............ G06K 9/00577 382/218 |
| 2009/0087098 A1* | 4/2009 | Ohira ................. G06K 9/00442 382/190 |
| 2010/0027896 A1* | 2/2010 | Geva et al. ..................... 382/229 |
| 2010/0245870 A1* | 9/2010 | Shibata ........................... 358/1.9 |
| 2010/0257141 A1* | 10/2010 | Monet et al. ................... 707/665 |
| 2012/0191719 A1* | 7/2012 | Musgrove et al. ............ 707/740 |

FOREIGN PATENT DOCUMENTS

| JP | 2008-167025 A | 7/2008 |
| JP | 2008-311828 A | 12/2008 |

\* cited by examiner

*Primary Examiner* — Stephen R Koziol
*Assistant Examiner* — Pinalben Patel
(74) *Attorney, Agent, or Firm* — James W. Judge (57) ABSTRACT

An image forming system includes a target-log-image extracting unit and a relevant-log-image extracting unit. The target-log-image extracting unit is configured to extract a log image as a target log image likely to have been generated by use for a specific purpose of an image forming apparatus when text information extracted from the log image of the image forming apparatus by optical character recognition includes a specific phrase. The relevant-log-image extracting unit is configured to extract a log image similar to the target log image as a relevant log image based on a specific feature of the target log image extracted by the target-log-image extracting unit.

15 Claims, 8 Drawing Sheets

| ATTRIBUTE | | NUMBER OF APPEARING CHARACTERS |
|---|---|---|
| FONT TYPE | FONT SIZE | |
| MS GOTHIC | 11 | 512 |
| ARIAL | 11 | 77 |
| MT HEISEI GOTHIC | 16 | 18 |
| . | . | . |
| . | . | . |
| . | . | . |

| PAPER SHEET SIZE | A4 SIZE |
|---|---|
| RULED-LINE INFORMATION | |

FIG. 8B

LOG-IMAGE EXTRACTING APPARATUS FOR HIGH SECURITY

CROSS-REFERENCE TO RELATED APPLICATION

This application is based upon, and claims the benefit of priority from, corresponding Japanese Patent Application No. 2013-107524 filed in the Japan Patent Office on May 21, 2013, the entire contents of which are incorporated herein by reference.

BACKGROUND

Unless otherwise indicated herein, the description in this section is not prior art to the claims in this application and is not admitted to be prior art by inclusion in this section.

A typical image forming system extracts a log image of an image forming apparatus. The typical image forming system generates data for search to extract a log image based on text information extracted from the log image by optical character recognition.

SUMMARY

An image forming system according to the disclosure includes a target-log-image extracting unit and a relevant-log-image extracting unit. The target-log-image extracting unit is configured to extract a log image as a target log image likely to have been generated by use for a specific purpose of an image forming apparatus when text information extracted from the log image of the image forming apparatus by optical character recognition includes a specific phrase. The relevant-log-image extracting unit is configured to extract a log image similar to the target log image as a relevant log image based on a specific feature of the target log image extracted by the target-log-image extracting unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8A illustrates an example of a target log image where the format of the document is acquired by the relevant-log-image extracting unit according to the embodiment; and FIG. 8B illustrates the format of the document acquired from the target log image by the relevant-log-image extracting unit according to the embodiment.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, an embodiment of the disclosure will be described with reference to the drawings. Firstly, a description will be given of a configuration of an image forming system 10 according to the embodiment.

Figure 1:
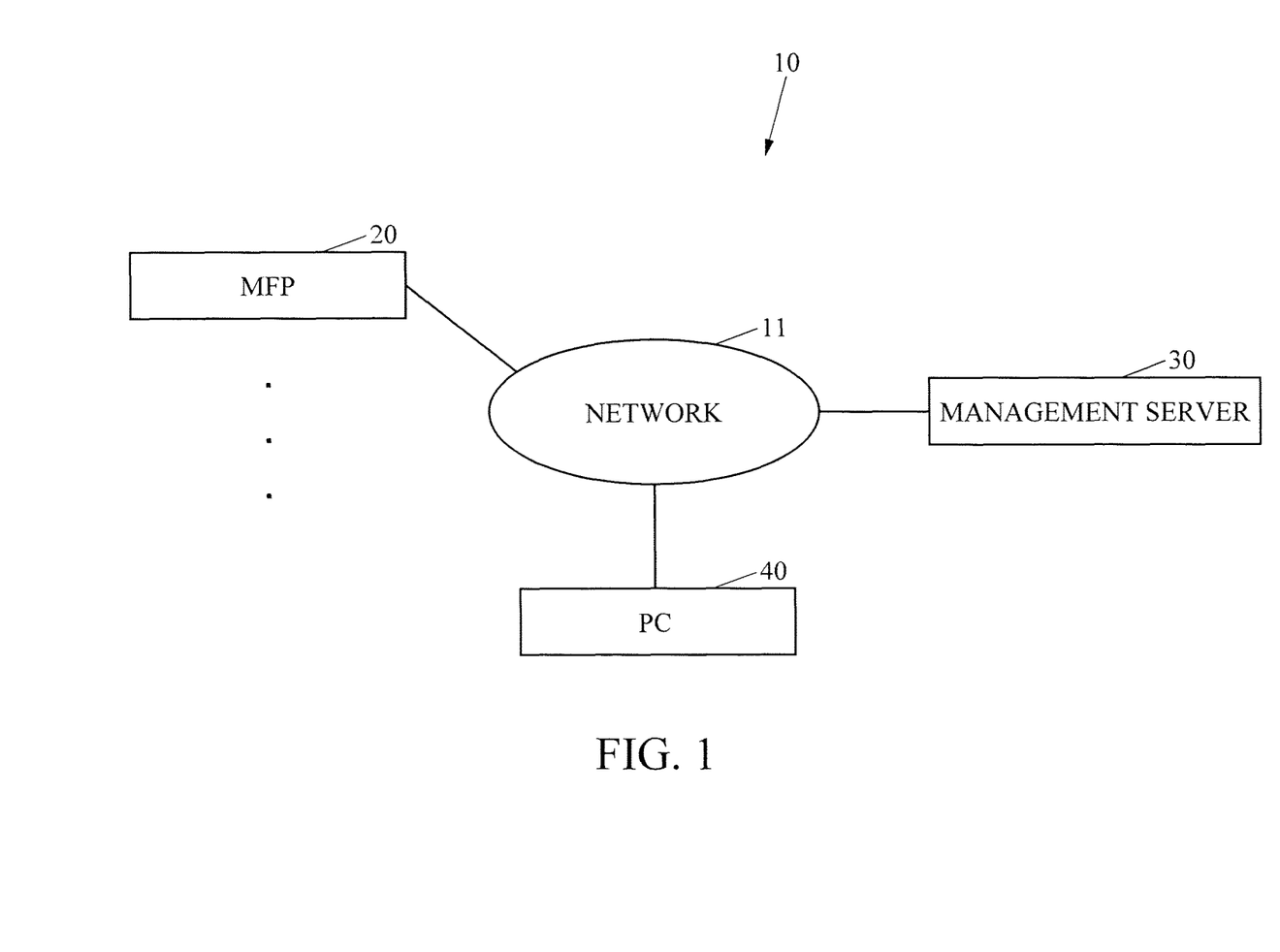
FIG. 1 illustrates a configuration of an image forming system according to an embodiment of the disclosure.

FIG. 1 illustrates the configuration of the image forming system 10 according to the embodiment. As illustrated in FIG. 1, the image forming system 10 includes a plurality of multifunction peripherals (MFPs) including an MFP 20 as an image forming apparatus, a management server 30 that is a computer for managing the plurality of MFPs including the MFP 20, and a personal computer (PC) 40 that can transmit print data to the plurality of MFPs including the MFP 20. The plurality of MFPs including the MFP 20 and the management server 30 are connected in a communicable manner with each other via a network 11 such as a local area network (LAN) and the Internet. Similarly, the plurality of MFPs including the MFP 20 and the PC 40 are connected in a communicable manner with each other via the network 11.

Each configuration of the plurality of MFPs included in the image forming system 10 is similar to the configuration of the MFP 20. Therefore, a description will be given of the MFP 20 below as a representative of the plurality of MFPs included in the image forming system 10.

Figure 2:
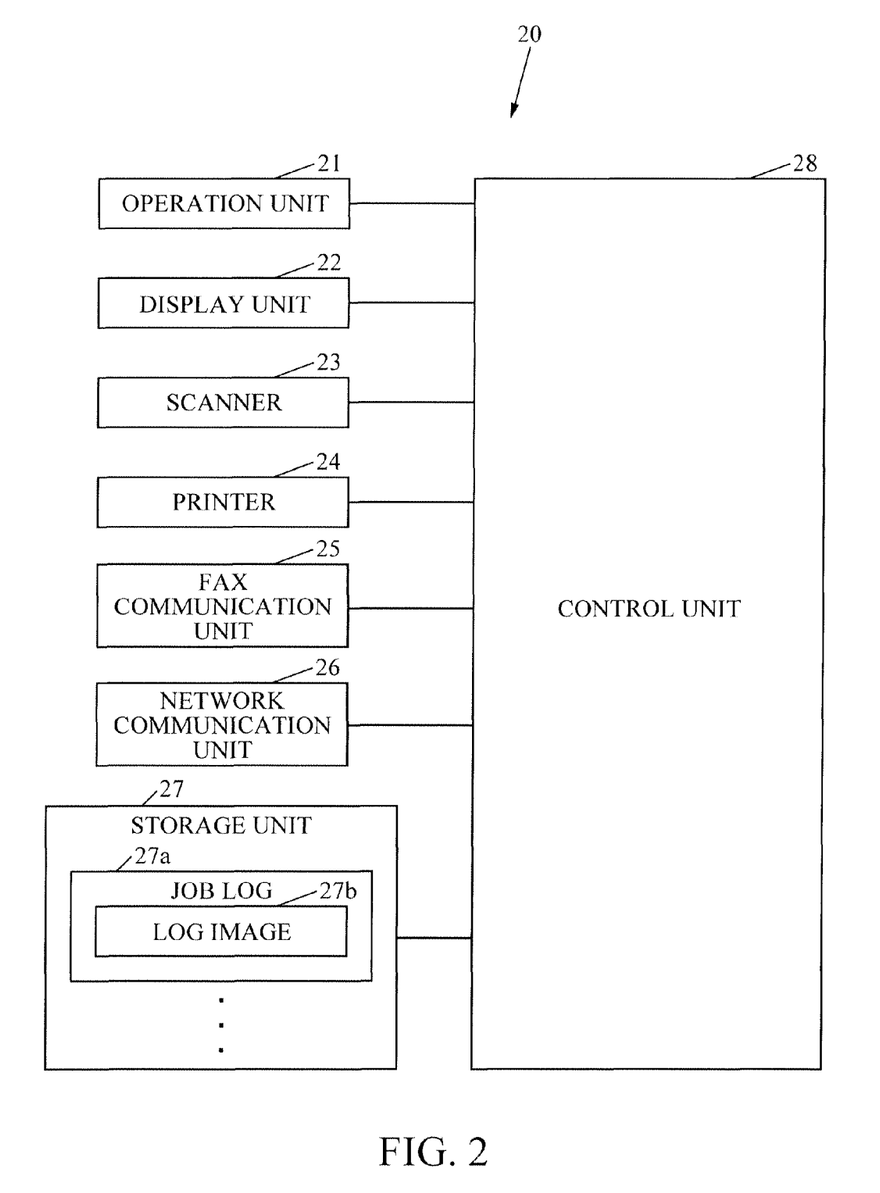
FIG. 2 illustrates a configuration of an MFP according to the embodiment.

FIG. 2 illustrates the configuration of the MFP 20. As illustrated in FIG. 2, the MFP 20 includes an operation unit 21, a display unit 22, a scanner 23, a printer 24, a fax communication unit 25, a network communication unit 26, a storage unit 27, and a control unit 28. The operation unit 21 is an input device such as a button for inputting various operations by a user. The display unit 22 is a device such as a liquid crystal display (LCD) that displays various information. The scanner 23 is a device that reads an image from an original document. The printer 24 is a device that executes a print job on a recording medium such as a paper sheet. The fax communication unit 25 is a device that performs fax communication with an external facsimile device (not illustrated) via a communication line such as a dial-up line. The network communication unit 26 is a device that communicates with an external device via the network 11 (see FIG. 1). The storage unit 27 is a non-volatile memory such as an electrically erasable programmable read only memory (EEPROM) and a hard disk drive (HDD) that store various data. The control unit 28 controls the entire MFP 20.

The operation unit 21 may include an input device that forms a touch panel together with the display unit 22.

The storage unit 27 can store a job log 27a indicative of the history of a job by the MFP 20 for each job. The job log 27a includes a log image 27b indicative of the history of images that have been output, for example, printed or transmitted in the job.

The control unit 28 includes, for example, a central processing unit (CPU), a read only memory (ROM) that stores a program and various data, and a random access memory (RAM) that is used for a work area of the CPU. The CPU executes a program stored in the ROM or the storage unit 27.

Figure 3:
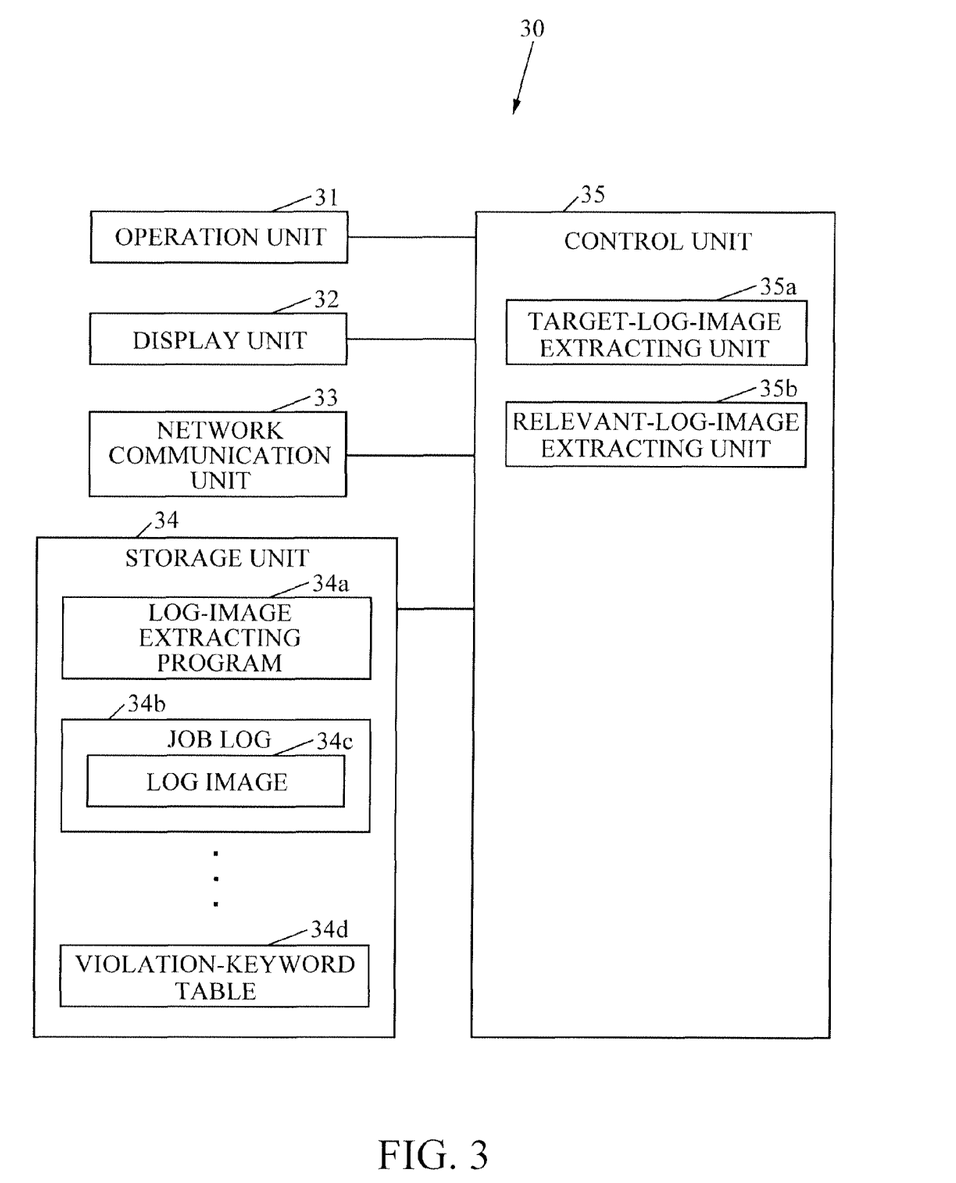
FIG. 3 illustrates a configuration of a management server according to the embodiment.

FIG. 3 illustrates the configuration of the management server 30. As illustrated in FIG. 3, the management server 30 includes an operation unit 31, a display unit 32, a network communication unit 33, a storage unit 34, and a control unit 35. The operation unit 31 is an input device such as a computer mouse and a keyboard to which various operations are input. The display unit 32 is a device such as an LCD that displays a variety of information. The network communication unit 33 is a device that communicates with an external device via the network 11 (see FIG. 1). The storage unit 34 is a non-volatile memory such as an HDD that stores a program and various data. The control unit 35 controls the entire management server 30.

The storage unit 34 stores a log-image extracting program 34a for extracting the log image of the MFP. The log-image extracting program 34a may be installed on the management server 30 at production stage of the management server 30, may additionally be installed on the management server 30 from a storage medium such as a compact disk (CD) and a digital versatile disk (DVD), or may be additionally installed on the management server 30 from the network 11.

The storage unit 34 can store a job log 34b indicative of the history of the job by the MFP for each job. The job log 34b includes a log image 34c indicative of the history of the images that have been output, for example, printed and transmitted in the job.

The storage unit 34 can store a violation-keyword table 34d including specific phrases for determining a specific purpose of the MFP 20, namely, the use for violating a security policy, in other words, one or a plurality of violation keywords.

Figure 4:
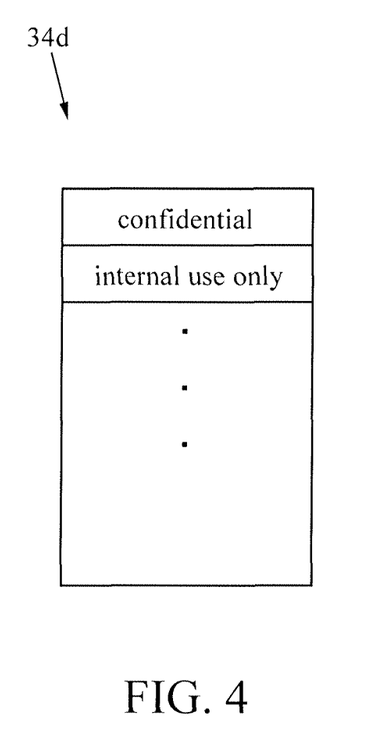
FIG. 4 illustrates an example of a violation-keyword table according to the embodiment.

FIG. 4 illustrates an example of the violation-keyword table 34d. The violation-keyword table 34d illustrated in FIG. 4 includes violation keywords such as "confidential" and "internal use only."

The control unit 35 illustrated in FIG. 3 includes, for example, a CPU, a ROM that stores a program and various data, and a RAM that is used for a work area of the CPU. The CPU executes a program stored in the ROM or the storage unit 34.

The control unit 35 executes the log-image extracting program 34a stored in the storage unit 34 to function as a target-log-image extracting unit 35a. The target-log-image extracting unit 35a extracts the log image 34c as a target log images likely to have been generated by use for violating the security policy of the MFP 20 when the text information extracted from the log image 34c of the MFP 20 by optical character recognition (OCR) includes the violation keyword. The control unit 35 further functions as a relevant-log-image extracting unit 35b that extracts the log image 34c similar to this target log image as a relevant log image based on a specific feature of the target log image extracted by the target-log-image extracting unit 35a.

Next, a description will be given of the operation of the image forming system 10. Firstly, a description will be given of the operation of the MFP 20 when a log image is generated.

Figure 5:
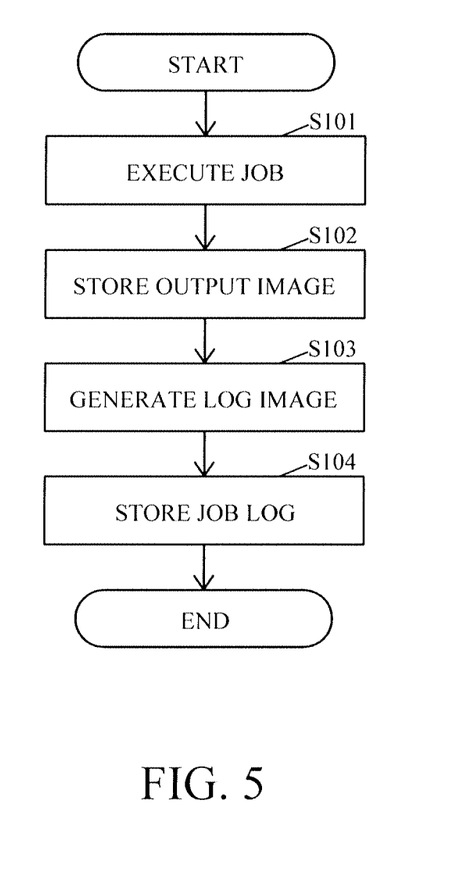
FIG. 5 illustrates an operation of the MFP according to the embodiment when generating a log image.

FIG. 5 illustrates the operation of the MFP 20 when generating a log image. As illustrated in FIG. 5, the control unit 28 of the MFP 20 executes the job in response to the instruction via the operation unit 21 or the instruction from the PC 40 via the network communication unit 26 (in S101) to cause the storage unit 27 to store the image that has been output, for example, printed or transmitted in the job as an output image (in S102).

Here, the instructions via the operation unit 21 include the instruction of the job for printing the image read from the original document by the scanner 23 or the image stored in the storage unit 27 by the printer 24, the instruction of the job for transmitting these images via the fax communication unit 25, the instruction of the job for transmitting these images via the network communication unit 26, or similar instruction.

Here, the images stored in the storage unit 27 include the image previously read from the original document by the scanner 23, the image previously received via the network communication unit 26, or similar image. The instructions from the PC 40 via the network communication unit 26 include the instruction of the job for printing the image received from the PC 40 via the network communication unit 26 by the printer 24, the instruction of the job for transmitting this image via the fax communication unit 25, the instruction of the job for transmitting this image via the network communication unit 26, or similar instruction.

After the process in S102, the control unit 28 uses the output image stored in the storage unit 27 in S102 to generate the log image 27b in a file format such as a portable document format (PDF) (in S103) and then includes the generated log image 27b in the job log 27a to store the log image 27b in the storage unit 27 (in S104), terminating the operation illustrated in FIG. 5.

Here, the control unit 28 can accept the login of the user, and includes the ID of the user who has executed the job in the job log 27a. That is, the log image 27b is associated with the user by the ID of the user included in the job log 27a that includes the log image 27b itself.

The control unit 28 transmits the job log 27a stored in the storage unit 27 to the management server 30 via the network communication unit 26 at specific timing. When the control unit 35 of the management server 30 receives the job log via the network communication unit 33, the control unit 35 stores the received job log in the storage unit 34 as the job log 34b.

Next, a description will be given of the operation of the management server 30 when extracting log image that violates the security policy.

Figure 6:
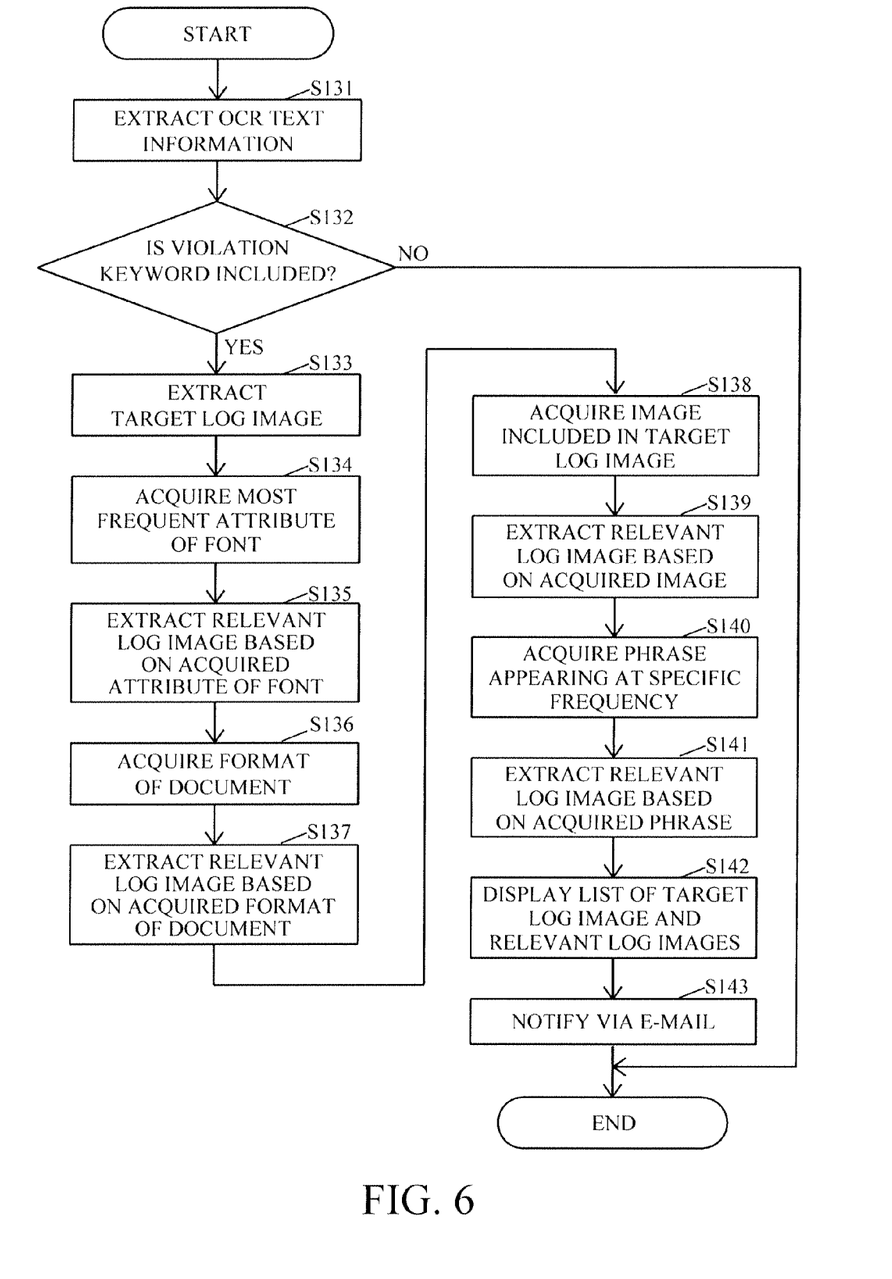
FIG. 6 illustrates an operation of the management server according to the embodiment when extracting a log image that violates the security policy.

FIG. 6 illustrates the operation of the management server 30 when extracting the log image that violates the security policy.

As illustrated in FIG. 6, the target-log-image extracting unit 35a of the control unit 35 in the management server 30 uses the log image 34c of the job log 34b stored in the storage unit 34 as a target to extract text information from the log image 34c by optical character recognition (OCR) (in S131), and then determines whether or not this text information (hereinafter referred to as "OCR text information") includes the violation keyword in the violation-keyword table 34d (in S132).

When the target-log-image extracting unit 35a determines that the OCR text information does not include the violation keyword in S132, the target-log-image extracting unit 35a terminates the operation illustrated in FIG. 6.

When it is determined that the OCR text information includes the violation keyword in S132, the target-log-image extracting unit 35a extracts the log image 34c, from which this OCR text information is extracted, as a target log image (in S133).

Subsequently, the relevant-log-image extracting unit 35*b* of the control unit 35 acquires the most frequent attribute among the attributes of the fonts included in the target log image extracted in S133 (in S134). Here, the attribute of the font is configured by, for example, the combination of a font type and a font size.

Figure 7:
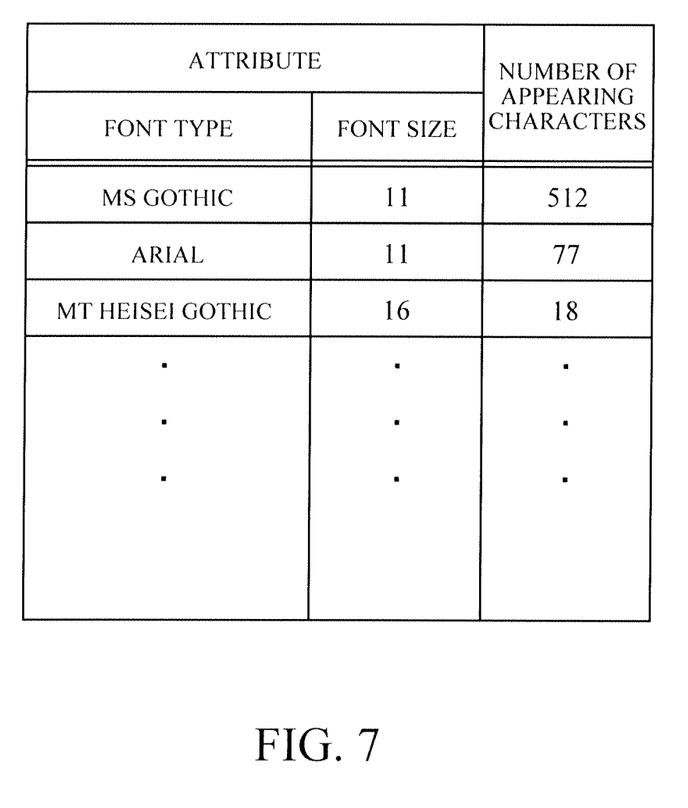
FIG. 7 illustrates an example when a relevant-log-image extracting unit according to the embodiment determines the most frequent attribute among attributes of fonts included in the log image.

FIG. 7 illustrates an example when the relevant-log-image extracting unit 35*b* determines the most frequent attribute among the attributes of the fonts included in the log image.

In the log image in the example illustrated in FIG. 7, 512 characters appear in the font where the font type and the font size are respectively "MS Gothic" and "11", 77 characters in the font where the font type and the font size are respectively "Arial" and "11", and 18 characters in the font where the font type and the font size are respectively "MT Heisei Gothic" and "16." Accordingly, in the example illustrated in FIG. 7, the relevant-log-image extracting unit 35*b* acquires the attribute where the font type and the font size are respectively "MS Gothic" and "11" as the most frequent attribute among the attributes of the fonts included in the log image.

As illustrated in FIG. 6, after the process in S134, the relevant-log-image extracting unit 35*b* extracts, as the relevant log image, the log image where the most frequent attribute among the attributes of the fonts included in this log image is the same as the attribute acquired in S134 from the log images associated with the same user as the user who is associated with the target log image among the log images 34*c* other than the target log image stored in the storage unit 34 (in S135).

Subsequently, the relevant-log-image extracting unit 35*b* acquires the format of the document included in the target log image, namely, the form type (in S136). Here, the format of the document is formed by, for example, a combination of the paper sheet size and the ruled-line information. Here, when the target log image is generated based on the image read from the original document by the scanner 23 of the MFP, the relevant-log-image extracting unit 35*b* sets the size of the original document read by the scanner 23 to the paper sheet size. Additionally, when the target log image is generated based on the image received by the network communication unit 26 of the MFP, the relevant-log-image extracting unit 35*b* sets the size of the image received by the network communication unit 26 to the paper sheet size. Additionally, the relevant-log-image extracting unit 35*b* acquires the ruled-line information by image processing of the target log image.

FIG. 8A illustrates an example of the target log image from which the format of the document is acquired by the relevant-log-image extracting unit 35*b*. FIG. 8B illustrates the format of the document acquired from the target log image illustrated in FIG. 8A by the relevant-log-image extracting unit 35*b*.

When the target log image is the image illustrated in FIG. 8A, the relevant-log-image extracting unit 35*b* acquires the combination of the paper sheet size and the ruled-line information illustrated in FIG. 8B, as the format of the document included in this target log image.

As illustrated in FIG. 6, after the process in S136, the relevant-log-image extracting unit 35*b* extracts the log image where the format of the document included in this log image is the same as or similar to the format of the document acquired in S136 to a specific degree from the log images associated with the same user as the user who is associated with the target log image among the log images 34*c* other than the target log image stored in the storage unit 34, as the relevant log image (in S137). When this specific degree is equal to or more than 80%, for example, the relevant-log-image extracting unit 35*b* determines the coordinates where ruled lines are drawn based on the paper sheet size and the ruled-line information regarding each of the target log image and the log image as a comparison target of the target log image. Subsequently, the relevant-log-image extracting unit 35*b* determines, based on this coordinate, how much proportion the ruled line arranged in the same position as the position in the target log image is included in the log image as the comparison target of the target log image, so as to extract the log image where the ruled line is included in 80% or more of the log image as the relevant log image. Here, this specific degree can be changed, for example, via the operation unit 31.

The relevant-log-image extracting unit 35*b* acquires an image included in the target log image after the process in S137 (in S138).

Subsequently, the relevant-log-image extracting unit 35*b* extracts the log image where the image included in this log image is the same as or similar to the image acquired in S138 to a specific degree from the log images associated with the same user as the user who is associated with the target log image among the log images 34*c* other than the target log image stored in the storage unit 34, as the relevant log image (in S139). This specific degree can be changed, for example, via the operation unit 31. When a plurality of images is acquired in S138, the relevant-log-image extracting unit 35*b* executes the process in S139 on each of the plurality of images. The methods for determining the images are the same as or similar to each other to a specific degree may employ various methods. For example, a function for comparing images in the OCR software program that extracts the OCR text information in S131 may be used.

After the process in S139, the relevant-log-image extracting unit 35*b* acquires the phrase appearing at a specific frequency among the phrases included in the OCR text information of the target log image (in S140). Here, the relevant-log-image extracting unit 35*b* does not include the violation keyword in the violation-keyword table 34*d* as a phrase to be acquired in S140. Additionally, the relevant-log-image extracting unit 35*b* may be configured to acquire a plurality of phrases such as the three most frequent phrases as the phrase appearing at a specific frequency. Here, this setting can be changed, for example, via the operation unit 31.

After the process in S140, the relevant-log-image extracting unit 35*b* extracts the log image where the OCR text information of this log image includes the phrase acquired in S140 from the log images associated with the same user as the user who is associated with the target log image among the log images 34*c* other than the target log image stored in the storage unit 34, as the relevant log image (in S141). Here, when a plurality of phrases are acquired in S140, the relevant-log-image extracting unit 35*b* may execute the process in S141 on each of this plurality of phrases, may extract the log image where the OCR text information includes any of this plurality of phrases as the relevant log image in S141, or may extract the log image where the OCR text information includes all of these plurality of phrases as the relevant log image in S141. The setting of the operation to be executed among these operations can be changed, for example, via the operation unit 31.

After the process in S141, the control unit 28 causes the display unit 32 to display the list of the target log image extracted in S133 and the relevant log images extracted in S135, S137, S139, and S141 (in S142). Here, the control unit 28 may display the list that classifies the target log image, the relevant log image extracted in S135, the relevant log image extracted in S137, the relevant log image extracted in S139, and the relevant log image extracted in S141. Additionally, the control unit 28 may be able to change the display order of the relevant log images in the list into the order based on a specific rule, for example, via the operation unit 31. For example, the relevant log image extracted in S139 may have the earlier number in the list as the relevant log image includes the larger number of images same as or similar to the image acquired in S138 to a specific degree.

Lastly, the control unit 28 notifies the administrator about the extraction of the log image that violates the security policy via e-mail (in S143), and then terminates the operation illustrated in FIG. 6.

The control unit 35 repeats the operation illustrated in FIG. 6 until the log image that has not been set as the target of the process in S131 yet disappears among the log images 34c stored in the storage unit 34.

As described above, the image forming system 10 extracts the relevant log image similar to the target log image based on the specific feature of this target log images likely to have been generated by use for violating the security policy of the MFP (in S135, S137, S139, and S141). Accordingly, the image forming system 10 can extract not only the target log image including the violation keyword (in S133) but also the relevant log image similar to this target log image as the log images likely to have been generated by use for violating the security policy of the MFP. Thus, the image forming system 10 can appropriately extract the log images likely to have been generated by use for violating the security policy of the MFP. For example, when the administrator actually confirms the target log image and the relevant log image, even if the target log image is not appropriate as the log image generated by use for violating the security policy of the MFP, the relevant log image may be appropriate as the log image generated by use for violating the security policy of the MFP in some cases. That is, the image forming system 10 allows the administrator to monitor the use for violating the security policy of the MFP with high accuracy compared with the configuration that extracts only the target log image, thus improving the tracking performance on the use for violating the security policy of the MFP.

The image forming system 10 extracts the relevant log image similar to the target log image based on the most frequent attribute among the attributes of the fonts included in this target log images likely to have been generated by use for violating the security policy of the MFP (in S135). Accordingly, the image forming system 10 can extract not only the target log image including the violation keyword but also the relevant log image similar to this target log image from the viewpoint of the attribute of the included font as the log images likely to have been generated by use for violating the security policy of the MFP. The documents included in a plurality of log images generated by use for violating the security policy of the MFP are highly likely to have been created with the attributes formed of the same fonts. Accordingly, it is effective to extract the relevant log image from the viewpoint of the attribute of the included font.

Additionally, the image forming system 10 extracts the relevant log image similar to the target log image based on the format of the document included in this target log images likely to have been generated by use for violating the security policy of the MFP (in S137). Accordingly, the image forming system 10 can extract not only the target log image including the violation keyword but also the relevant log image similar to this target log image from the viewpoint of the format of the included document as the log images likely to have been generated by use for violating the security policy of the MFP. Here, the examples of the document that has an effective format of the document for extracting the relevant log image include the document that is highly likely to have been written in a specific format such as an address list, a company directory, a resume, and a request for approval. The documents included in a plurality of log images generated by use for violating the security policy of the MFP are highly likely to have been created in the same formats or similar formats to a specific degree. Accordingly, it is effective to extract the relevant log image from the viewpoint of the format in the included document.

The image forming system 10 extracts the relevant log image similar to the target log image based on the image included in this target log images likely to have been generated by use for violating the security policy of the MFP (in S139). Accordingly, the image forming system 10 can extract not only the target log image including the violation keyword but also the relevant log image similar to this target log image from the viewpoint of the included image as the log images likely to have been generated by use for violating the security policy of the MFP. Here, the examples of the image included in the log image include a logo, a company stamp, and similar image. The document included in a plurality of log images generated by use for violating the security policy of the MFP is highly likely to have been created so as to include the same image or a similar image to a specific degree. Accordingly, it is effective to extract the relevant log image from the viewpoint of the included image.

The image forming system 10 extracts the relevant log image similar to the target log image, based on the phrase appearing at the specific frequency among the phrases included in the text information of this target log images likely to have been generated by use for violating the security policy of the MFP (in S141). Accordingly, the image forming system 10 can extract not only the target log image including the violation keyword but also the relevant log image similar to this target log image from the viewpoint of the included phrase, as the log images likely to have been generated by use for violating the security policy of the MFP. Here, examples of the phrase for extracting the relevant log image include a new product name unreleased outside the company, link destination information, and similar information. The link destination information includes, for example, a uniform resource locator (URL) such as "http://XXXX.XX/XXX/XXX" and a destination such as "XX Section, XX Department, XX Corporation." The documents included in the plurality of log images likely to have been generated by use for violating the security policy of the MFP are highly likely to have been created to include the same phrases. Accordingly, it is effective to extract the relevant log image from the viewpoint of the included phrase.

In this embodiment, the image forming system 10 extracts the relevant log image from four viewpoints including the viewpoint of the attribute of the font included in the log image, the viewpoint of the format of the document included in the log image, the viewpoint of the image included in the log image, and the viewpoint of the phrase included in the log image. However, the image forming system 10 may extract the relevant log image from one or more viewpoints specified from these four viewpoints. This specification can be performed, for example, via the operation unit 31.

While in this embodiment the image forming system 10 employs the combination of the font type and the font size as the attribute of the font for extracting the relevant log image, an attribute other than the combination of the font type and the font size is possible. For example, the image forming system 10 may employ one of the font type and the font size as the attribute of the font for extracting the relevant log image, or may additionally employ an attribute different from these.

While in this embodiment the image forming system 10 employs the combination of the paper sheet size and the ruled-line information as the format of the document for extracting the relevant log image, a format other than the combination of the paper sheet size and the ruled-line information is possible. For example, the image forming system 10 may employ one of the paper sheet size and the ruled-line information as the format of the document for extracting the relevant log image, or may additionally employ a format different from these. For example, the image forming system 10 may employ the header, the footer, and similar of the document as the format of the document for extracting the relevant log image.

While in this embodiment the image forming system 10 causes the display unit 32 to display a list of the target log image and the relevant log image in S142, the list of these images may be enclosed in the e-mail in S143 to be transmitted.

While in this embodiment the image forming system 10 including the MFP and the management server 30 causes the management server 30 to extract the target log image and the relevant log image, the target log image and the relevant log image may be extracted without the management server 30. That is, the MFP may have a function of the management server 30 described in this embodiment so as to independently extract the target log image and the relevant log image.

While in this embodiment the image forming apparatus of the disclosure is an MFP, the image forming apparatus may be an image forming apparatus other than the MFP, for example, a printer-only machine, a copy-only machine, a FAX-only machine, and similar machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system, comprising:
an image forming apparatus including a storage unit storing an image-forming job log containing log images indicating a history of images output in jobs performed by the image forming apparatus; and
a management server communicably connected with the image forming apparatus via a network, the management server having a storage unit storing the image-forming job log as transmitted to the management server from the image forming apparatus via the network, and the management server having a control unit constituted by control circuitry, wherein the control circuitry is programmed to operate as
a target-log-image extracting unit performing optical character recognition on the image-forming job log to extract text information from the log images in the image-forming job log so as to extract, on the basis of the extracted log-image text information, a document-including target log image likely to have been generated by use for a specific purpose of the image forming apparatus, and
a relevant-log-image extracting unit
extracting, from comparison-target log images in the image-forming job log other than the target log image, a log image similar to the target log image, as a relevant log image, based on a specific feature of the target log image extracted by the target-log-image extracting unit, the specific feature being at least document ruled-line arrangement as one of document format items according to which the target-log-image document is formatted, and
if a comparison-target log image includes a document formatted with a ruled-line arrangement similar to at least a specific extent to the ruled-line arrangement of the target-log-image document, the relevant-log-image extracting unit extracts the comparison-target log image as the relevant log image.

2. The image forming system according to claim 1, wherein:
the specific feature includes a most-frequent attribute among attributes of fonts included in the document-including target log image; and
if the most-frequent attribute among the attributes of the fonts included in the document-including target log image matches a most-frequent attribute among attributes of fonts included in a log image in the image-forming job log other than the target log image, the relevant-log-image extracting unit extracts the matching comparison-target log image as the relevant log image.

3. The image forming system according to claim 1, wherein:
the document format items include at least any one of paper sheet size, header, footer, and a format item different from paper sheet size, header, and footer; and
if the format of the target-log-image document matches, to a specific degree, format of a document-including comparison-target log image, the relevant-log-image extracting unit extracts the matching comparison-target log image as the relevant log image.

4. The image forming system according to claim 1, wherein:
the specific feature includes an image included in the document-including target log image; and
if the image included in the document-including target log image matches, to a specific degree, an image included in a comparison-target log image, the relevant-log-image extracting unit extracts the matching comparison-target log image as the relevant log image.

5. The image forming system according to claim 1, wherein:
the specific feature includes a phrase appearing at a specific frequency among phrases included in the extracted log-image text information for the document-including target log image; and
if the phrase appearing at the specific frequency among the phrases included in the extracted log-image text information for the document-including target log image is included in the extracted log-image text information for a comparison-target log image, the relevant-log-image extracting unit extracts the phrase-including log image as the relevant log image.

6. For an image forming system comprising an image forming apparatus including a storage unit storing an image-forming job log containing log images indicating a history of images output in jobs performed by the image forming apparatus, and a management server communicably connected with the image forming apparatus via a network, the management server having a storage unit storing the image-forming job log as transmitted to the management server from the image forming apparatus via the network, and the management server having a control unit constituted by control circuitry, a non-transitory computer-readable recording medium storing a log-image extracting program, the log-image extracting program causing the management-server control circuitry to function as:
a target-log-image extracting unit performing optical character recognition on the image-forming job log to extract text information from the log images in the image-forming job log so as to extract, on the basis of the extracted log-image text information, a document-including target log image likely to have been generated by use for a specific purpose of the image forming apparatus, and a relevant-log-image extracting unit extracting, from comparison-target log images in the image-forming job log other than the target log image, a log image similar to the target log image, as a relevant log image, based on a specific feature of the target log image extracted by the target-log-image extracting unit, the specific feature being at least document ruled-line arrangement as one of document format items according to which the target-log-image document is formatted, and if a comparison-target log image includes a document formatted with a ruled-line arrangement similar to at least a specific extent to the ruled-line arrangement of the target-log-image document, the relevant-log-image extracting unit extracts the comparison-target log image as the relevant log image.

7. The non-transitory computer-readable recording medium according to claim 6, wherein:

the specific feature includes a most-frequent attribute among attributes of fonts included in the document-including target log image; and if the most-frequent attribute among the attributes of the fonts included in the document-including target log image matches a most-frequent attribute among attributes of fonts included in a log image in the image-forming job log other than the target log image, the relevant-log-image extracting unit extracts the matching log image as the relevant log image.

8. The non-transitory computer-readable recording medium according to claim 6, wherein:

the document format items include at least any one of paper sheet size, header, footer, and a format item different from paper sheet size, header, and footer; and if the format of the target-log-image document matches, to a specific degree, format of a document-including comparison-target log image, the relevant-log-image extracting unit extracts the matching comparison-target log image as the relevant log image.

9. The non-transitory computer-readable recording medium according to claim 6, wherein:

the specific feature includes an image included in the document-including target log image; and if the image included in the document-including target log image matches, to a specific degree, an image included in a comparison-target log image, the relevant-log-image extracting unit extracts the matching log image as the relevant log image.

10. The non-transitory computer-readable recording medium according to claim 6, wherein:

the specific feature includes a phrase appearing at a specific frequency among phrases included in the extracted log-image text information for the document-including target log image; and if the phrase appearing at the specific frequency among the phrases included in the extracted log-image text information for the document-including target log image is included in the extracted log-image text information for a comparison-target log image, the relevant-log-image extracting unit extracts the phrase-including log image as the relevant log image.

11. In an image forming system comprising an image forming apparatus including a storage unit storing an image-forming job log containing log images indicating a history of images output in jobs performed by the image forming apparatus, and a management server communicably connected with the image forming apparatus via a network, the management server having a storage unit storing the image-forming job log as transmitted to the management server from the image forming apparatus via the network, an image-forming job log log-image generating method, comprising:

a target-log-image extracting process of performing optical character recognition on the image-forming job log to extract text information from the log images in the image-forming job log and extracting, on the basis of the extracted log-image text information, a document-including target log image likely to have been generated by use for a specific purpose of the image forming apparatus;

extracting, from comparison-target log images in the image-forming job log other than the target log image, a log image similar to the target log image, as a relevant log image, based on a specific feature of the target log image extracted by the target-log-image extracting process, the specific feature being at least document ruled-line arrangement as one of document format items according to which the target-log-image document is formatted; and if a comparison-target log image includes a document formatted with a ruled-line arrangement similar to at least a specific extent to the ruled-line arrangement of the target-log-image document, extracting the comparison-target log image as the relevant log image.

12. The log-image generating method according to claim 11, wherein:

the specific feature includes a most-frequent attribute among attributes of fonts included in the document-including target log image; and if the most-frequent attribute among the attributes of the fonts included in the document-including target log image matches a most-frequent attribute among attributes of fonts included in a log image in the image-forming job log other than the target log image, the target-log-image extracting process extracts the matching comparison-target log image as the relevant log image.

13. The log-image generating method according to claim 11, wherein:

the document format items include at least any one of paper sheet size, header, footer, and a format item different from paper sheet size, header, and footer; and if the format of the document included in target-log-image document matches, to a specific degree, format of a document-including comparison-target log image, the target-log-image extracting process extracts the matching comparison-target log image as the relevant log image.

14. The image forming method according to claim 11, wherein:

the specific feature includes an image included in the document-including target log image; and if the image included in the document-including target log image matches, to a specific degree, an image included in a comparison-target log image, the target-log-image extracting process extracts the matching comparison-target log image as the relevant log image.

15. The image forming method according to claim 11, wherein:

the specific feature includes a phrase appearing at a specific frequency among phrases included in the extracted log-image text information for the document-including target log image; and if the phrase appearing at the specific frequency among the phrases included in the extracted log-image text information for the document-including target log image is included in the extracted log-image text information for a comparison-target log image, the target-log-image extracting process extracts the log image as the relevant log image.

\* \* \* \* \*